US005444671A

United States Patent [19]

Tschannen et al.

[11] Patent Number: 5,444,671

[45] Date of Patent: Aug. 22, 1995

[54] WRISTWATCH WITH MESSAGE TRANSMITTER

[76] Inventors: Andreas Tschannen, Kappelenstrasse 5, 3250 Lyss; Henri Cosandier, Grubenweg 10, 2563 Ipsach, both of Switzerland

[21] Appl. No.: 131,614

[22] Filed: Oct. 5, 1993

[30] Foreign Application Priority Data

Oct. 5, 1992 [CH] Switzerland .......................... 3093/92

[51] Int. Cl.⁶ ....................... G04B 47/00; G04C 11/02; H04Q 7/00

[52] U.S. Cl. ....................................... 368/10; 368/43; 368/47; 340/825.44; 340/825.56; 455/89; 455/100

[58] Field of Search ......................... 368/3, 10, 13, 47; 340/825.44–825.49, 825.56; 379/53, 56, 57, 58, 61; 455/161, 73, 74, 88, 89, 100

[56] References Cited

U.S. PATENT DOCUMENTS

| | | | |
|---|---|---|---|
| 4,644,352 | 2/1987 | Fujii | 340/825.44 |
| 5,185,604 | 2/1993 | Nepple et al. | 340/825.44 |
| 5,189,413 | 2/1993 | Gaskill et al. | 340/825.44 |
| 5,285,493 | 2/1994 | Wagai | 379/58 |
| 5,335,246 | 8/1994 | Yokev et al. | 375/1 |

*Primary Examiner*—Vit W. Miska

*Attorney, Agent, or Firm*—Oblon, Spivak, McClelland, Maier, & Neustadt

[57] ABSTRACT

In a timepiece provided with means to set the time, dates and an alarm time, and display means to indicate functions, means are foreseen to enter messages and announcements. Via a transmitter built into the watch, these messages can be conveyed to a corresponding receiver. At the same time the timepiece is equipped to receive messages, it being possible to receive messages transmitted by another corresponding transmitter. These messages can be indicated by display means which are housed in the timepiece. Thus this timepiece can be used as a means of communication.

4 Claims, 5 Drawing Sheets

WRISTWATCH WITH MESSAGE TRANSMITTER

The invention relates to a timepiece, in particular a wristwatch, with means to set the time, the date and the alarm time and with display means to indicate functions such as time, date, stop and alarm functions, and means to transmit and receive signals wirelessly.

Timepieces of this kind are known. For example, Swiss published patent 607 669 discloses a wristwatch which is equipped with a transmitter and a receiver. The transmitter and the receiver are controlled by means of a quartz oscillator. It is thereby possible to transmit an alarm signal with this timepiece, and an alarm signal transmitted from a second corresponding timepiece can be received. The signal received activates a display element on the timepiece, which indicates the alarm signal to the wearer.

This device has the disadvantage that only an alarm signal can be transmitted and an indication given of when an alarm signal is received from another corresponding timepiece.

It is the object of the present invention to enable alphanumerical messages to be entered in a timepiece which can be called up and can be indicated by display means and which can be transmitted to a corresponding receiver.

A further object of the invention is to foresee means of receiving alphanumerical messages transmitted by a receiver built into another corresponding timepiece, it being possible to call up these messages and indicate them with display means.

These objects of the invention are fulfilled by a timepiece having:

- means to enter alphanumerical messages which can be indicated by display means;
- means to transmit the entered alphanumerical messages at a distance of approximately 50 to 200 m to receiving means which are contained in corresponding timepieces;
- means to receive alphanumerical messages which are transmittable by transmission means contained in corresponding timepieces at a distance of approximately 50 to 200 m, and which can be indicated by the display means;
- means to control these various functions;
- a digital electronic part for processing the messages to be transmitted or received, respectively; and
- a memory to store the messages to be transmitted or received, respectively.

The means to enter alphanumerical messages consist preferably of a ring, which is rotatably disposed on the case of the timepiece, and which is rotatably disposed around the display means. There are signs and symbols on this ring, a corresponding sign or symbol to be entered being synchronized with a reference mark located on the case, this sign or symbol then being entered by operating a control means. This way the input of messages is made simple.

One preferred embodiment of the invention consists in putting the entered alphanumerical messages and the received alphanumerical messages into digital form in a digital electronic part so that the transmission of the corresponding message takes place digitally, and reception of digitalized messages sent by other corresponding timepieces is made possible. Achieved by means of this step is that the required energy, provided by a battery in the timepiece, is minimal.

Another preferred embodiment of the invention consists in designing the display means as an LCD matrix. This way the various modes can be called in and displayed simply.

In a further preferred embodiment of the invention, the control elements, with which the individual modes and corresponding functions can be controlled and executed, are push buttons put on the periphery of the timepiece case. The result is easy operation of the whole device.

The messages to be transmitted can be given preferably a code which can be received only by receivers which are provided with a corresponding code. By coding the messages a particular addressee can be selected and it can be avoided that the corresponding message reaches another correspondingly equipped timepiece.

The invention will be explained more closely in the following, by way of example, with the aid of drawings in which FIG. 1 is a view of a watch according to the invention;

Figure 1:
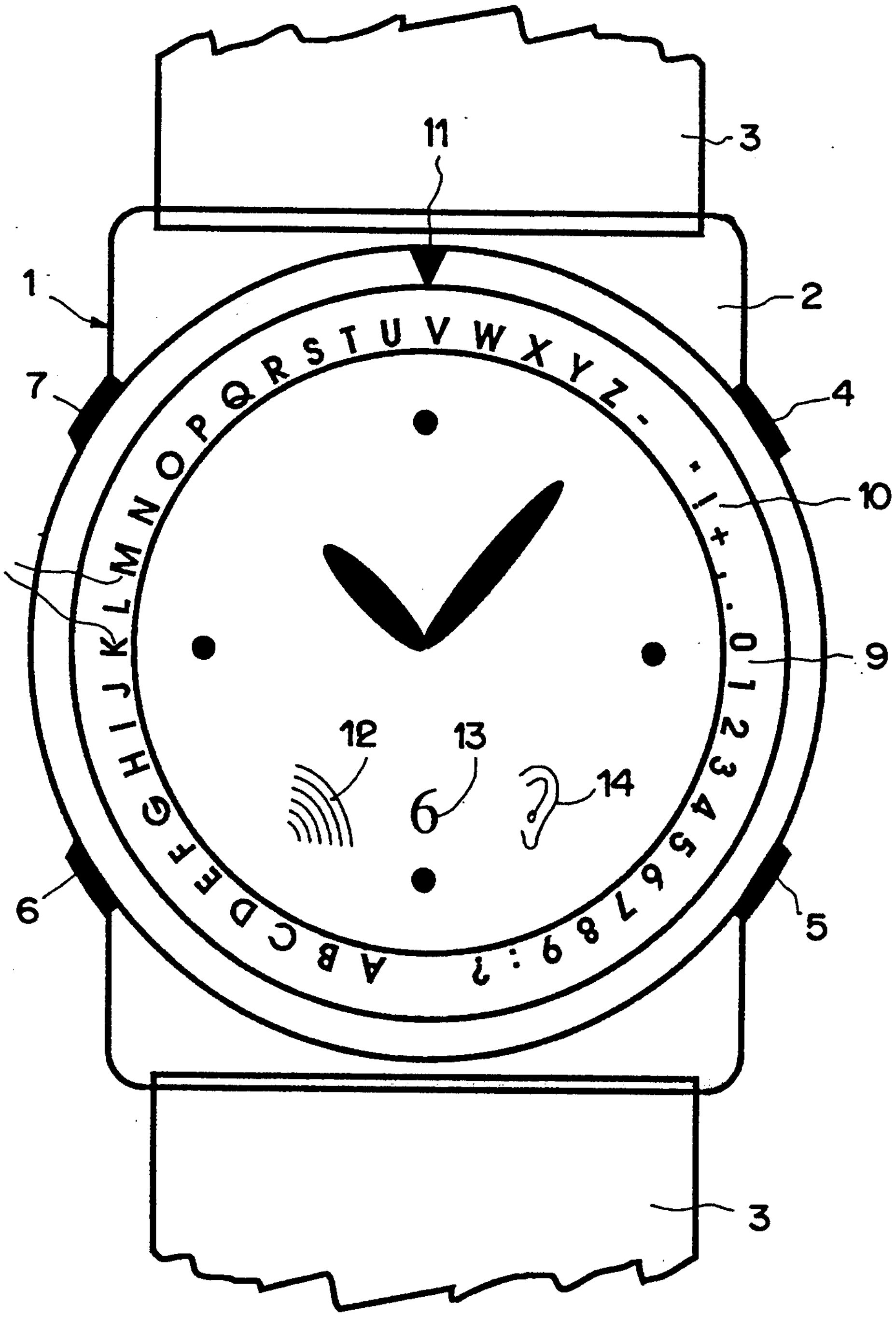

The timepiece, as it is shown in FIG. 1, namely as a wristwatch 1, comprises a case 2, on which the bands 3 are attached in a known way. Disposed on the periphery of the case 2 are four buttons 4, 5, 6 and 7 by means of which the functions later described can be selected and controlled. The upper surface of case 2 forms a display means 8 having essentially the shape of a circular disc, which is designed as an LCD matrix in this embodiment.

In the case, rotatably disposed around the display means 8, is a ring 9. Distributed evenly on the perimeter of the upper surface of this ring 9 are signs and symbols 10, thereby permitting each sign or symbol 10 to be brought into a reference position determined by the reference sign 11, which is fixed to the case 2 of the wristwatch 1.

Visible in FIG. 1 is the first display mode, which will be described in more detail later, in which the current time is indicated. Displayed at the same time can be another symbol 12 for transmission readiness, an index 13 of the message to be sent and a symbol 14 for readiness to receive. These symbols indicate when the timepiece is ready to carry out the corresponding functions, to be described further later on.

The embodiment described here of the inventive timepiece has five permanently programmed modes. Button 4 can be pushed to call up these individual modes, the timepiece being switched to the next mode as appears on the display means 8.

Figure 2:
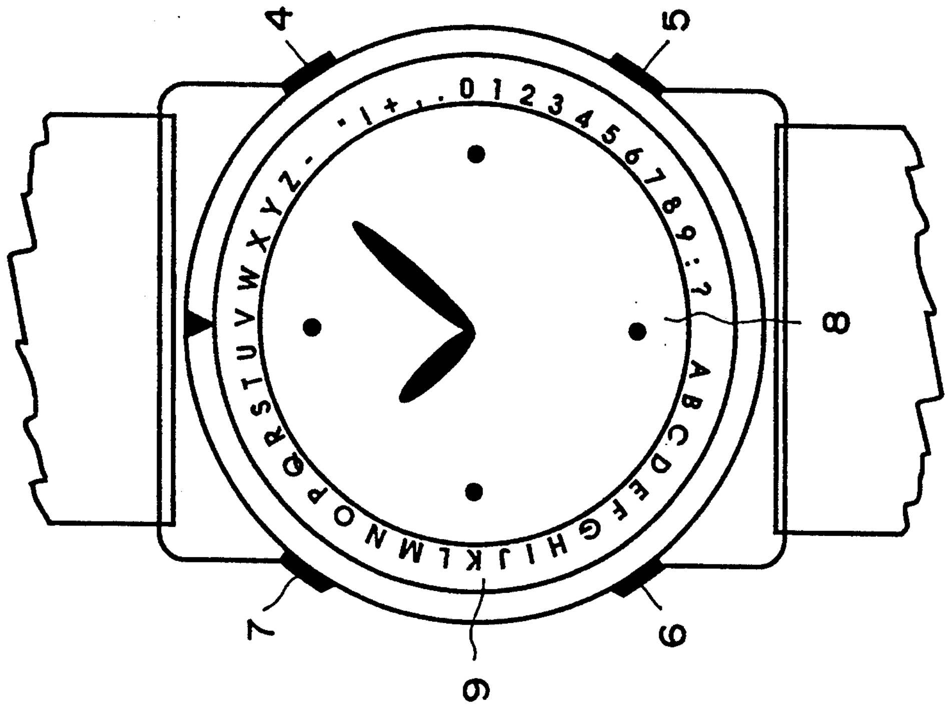
FIG. 2 is a view of the first mode presented in the display part of this watch, in which mode a time indication is given in analog form.
Figure 3:
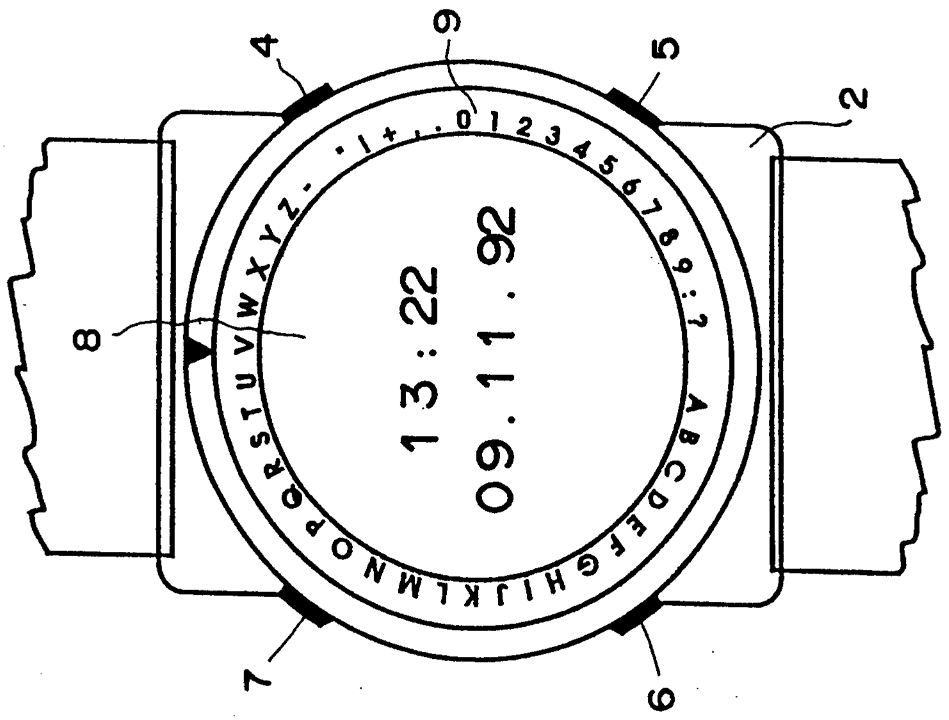
FIG. 3 is a view of the first mode presented in the display part of this watch, in which mode a time indication is given in digital form.
Figure 7:
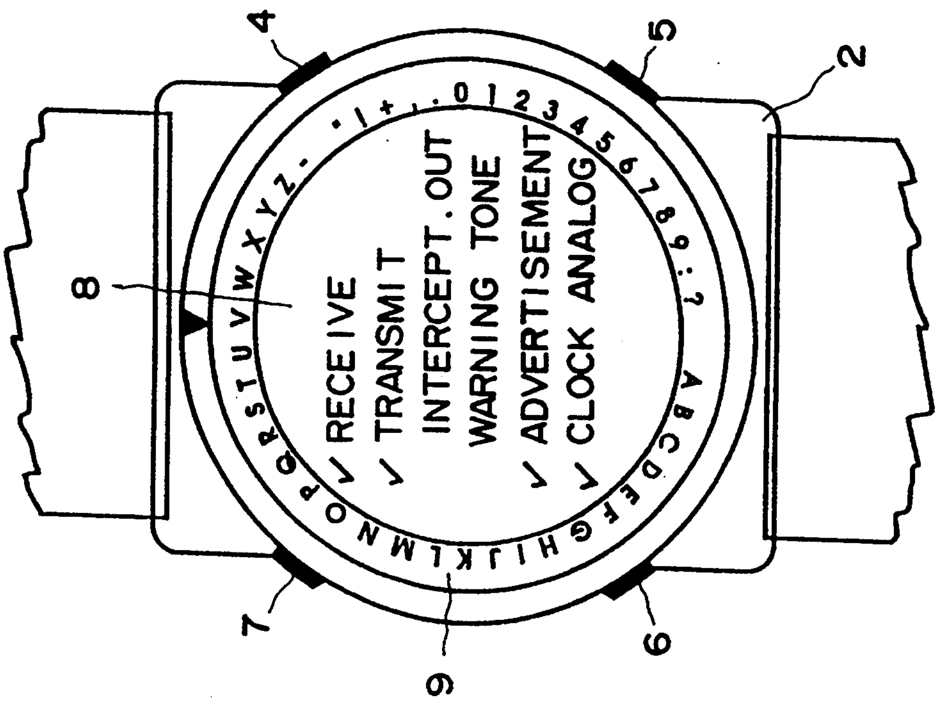
FIG. 7 is a view of a fifth mode presented in the display part of this watch in which the options desired can be selected.
Figure 5:
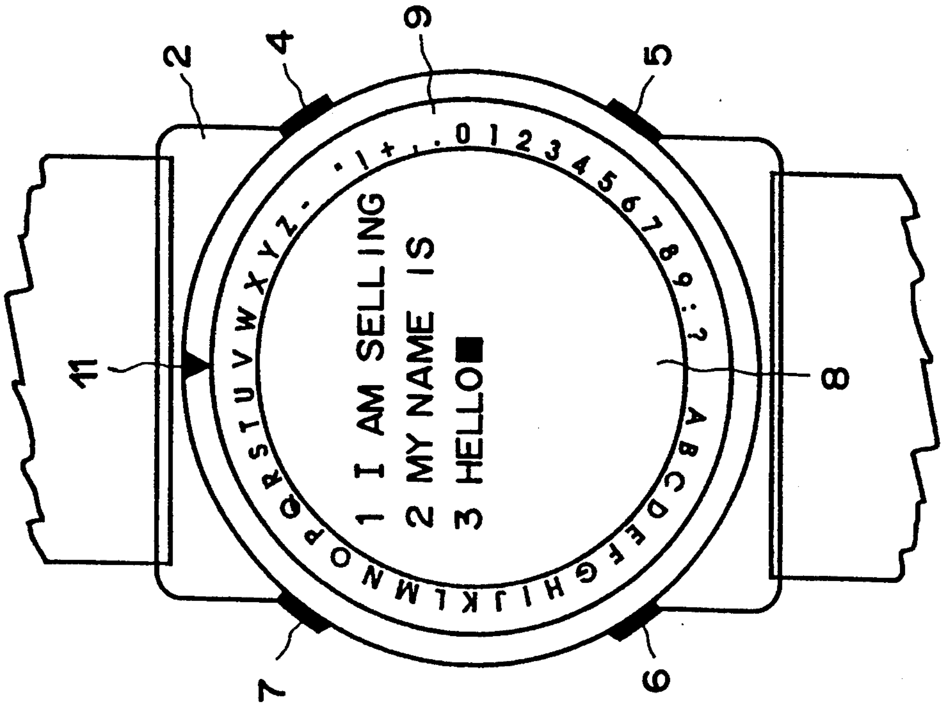
FIG. 5 is a view of a third mode presented in the display part of this watch in which the corresponding messages can be entered.

The first mode causes the time indication to be shown on display means 8, as shown in FIG. 3. Here a selection can be made as to whether this time indication takes place in analog form, as shown in FIG. 2, or in digital form, as shown in FIG. 3. As will still be explained, the changeover from analog display to digital display and vice-versa takes place in mode 5 (FIG. 7).

Figure 4:
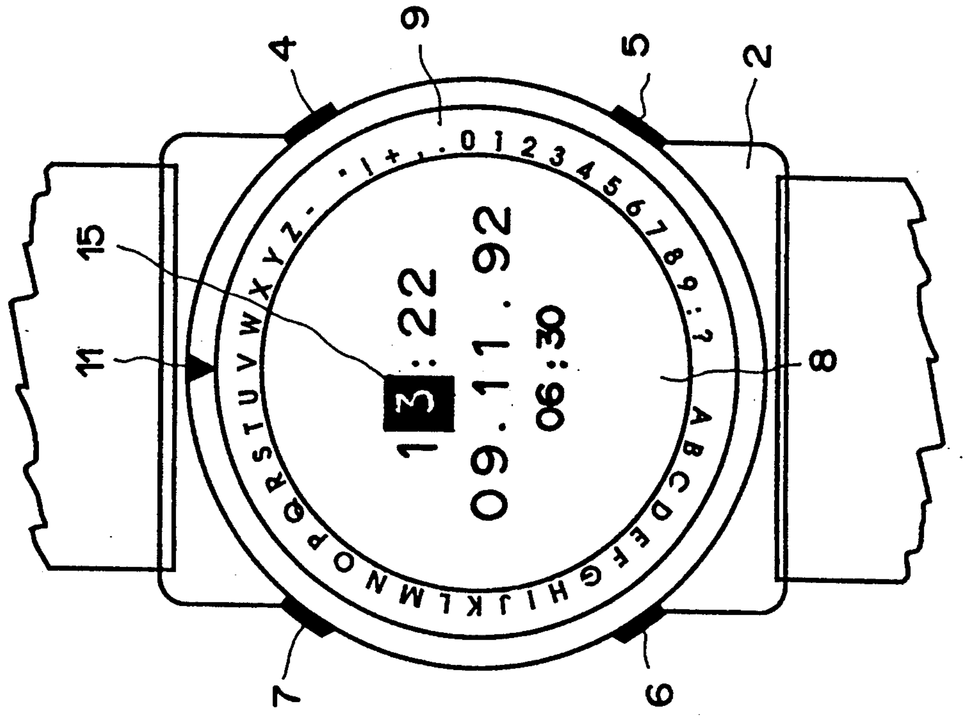
FIG. 4 is a view of a second mode presented in the display part of this watch in which the actual time, the date and an alarm time can be set.

Setting the clock time, the date and the alarm time takes place in mode 2. By pressing button 4 a changeover is made from mode 1 to this mode 2. The picture shown in FIG. 4 then appears on the display. Using button 5, the numeral to be changed 15 can be selected. This numeral 15 can be highlighted, i.e. shown in reversed colors, or can be made recognizable by blinking. The new numeral is now chosen on ring 9 and is brought to the reference symbol 11, after which the new numeral is written over the old one through actuation of button 6. By repeating the procedure just described all the numerals shown in this mode can be changed.

Messages can be entered in the third mode, presented on the display means 8. Each of these messages is numbered individually. The numbering can be selected from 0 to 9 and from A to Y. The selection of the designating numbering of a corresponding message takes place by pressing button 5. The corresponding letters or symbols, respectively, are chosen by turning ring 9 and synchronizing them with the reference sign 11 and actuating button 6. This step is continued until the text desired has been generated. The various messages can be stored in the memory 16 (FIG. 8).

Figure 8:
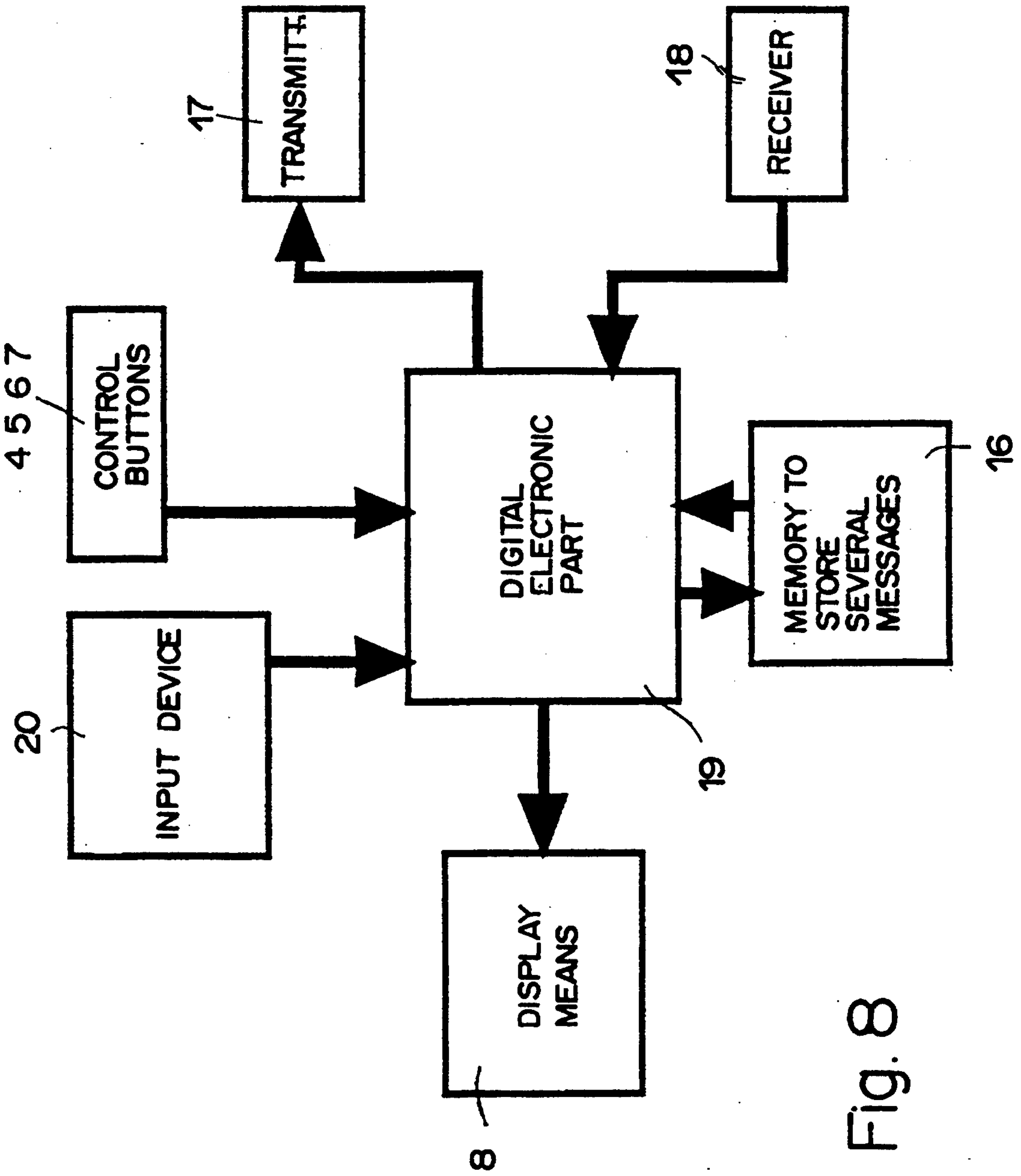
FIG. 8 is a block schematic diagram of the electronic circuit arrangement of the watch according to the invention.

To transmit a corresponding alphanumerical message, the message is selected by means of button 5, then this message is transmitted by the transmitter (FIG. 8). Selection can also take place directly using the ring.

Figure 6:
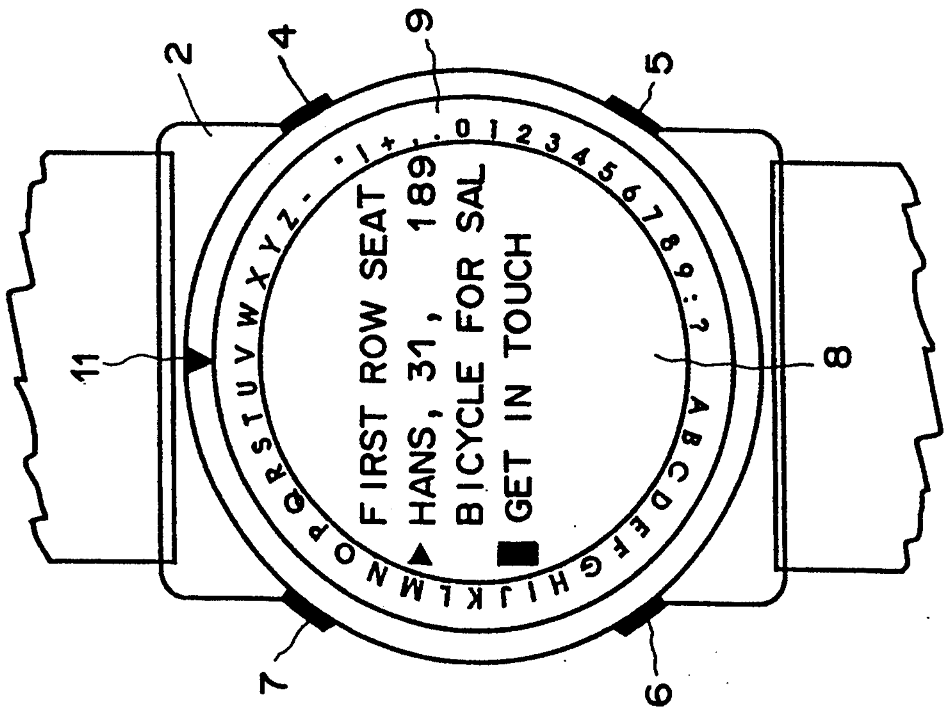
FIG. 6 is a view of a fourth mode presented in the display part of this watch in which the messages received can be displayed.

In the fourth mode, as shown in FIG. 6, the alphanumerical messages received by the receiver 18 (FIG. 8) which have been transmitted from other corresponding timepieces and which have been stored in the memory 16, can be indicated by the display means 8. For example, 99 messages can be stored in this way, the message first received being written over when this number has been exceeded. Particular messages can be protected against being written over by selecting the corresponding message through actuation of button 5 then setting ring 9 on M and pressing button 6. Then this message cannot be overwritten.

To achieve transmission times which are as short as possible, an FSK (Frequency-Shift-Keying) transmitter or receiver, respectively, is built into the timepiece. A serial transmission of digital data can thus take place, for example, at 9600 Baud.

Transmission of a message of 25 symbols, for example, takes about 50 milliseconds, the energy requirement therefor being minimal.

In mode 5, as shown in FIG. 7, various options can be set. Using button 5 one of the fixed options can be chosen, while using button 6 they can be turned on and off. The option "receive" makes it possible to switch the timepiece onto ready to receive, making it possible to receive the messages which are transmitted by other timepieces. With the "transmit" option, the timepiece is ready to transmit. Then a corresponding message, as described under mode 3, can be transmitted.

A transmitted message, which has been transmitted by such a timepiece, can be received by all timepieces of the same kind which are located within the transmission range. The transmission range of this timepiece is about 50 to 200 meters. In order to make it possible that only a particular other timepiece can be selected to receive the corresponding message, each timepiece can be coded. This code can be entered into the corresponding timepiece when the battery is put in.

With the option "interceptors excluded" according to FIG. 7, the code word of the receiver can be entered in mode 3 under the symbol Z reserved for this purpose, with which the message is then designated. In this way the message can only be received by the specially designated receiver.

The option "warning tone" can be switched on or off, respectively, in the switched-on state each message arriving causing a warning signal to be given.

The option "advertising texts" permits in the switched-on state reception of advertisement texts which are transmitted by a special transmitter for advertising purposes.

The last option "timepiece analog" makes it possible to switch the time indication in mode 1 from analog display to digital display.

As can be seen from the block schematic diagram according to FIG. 8, the central part of this timepiece comprises a digital electronic part 19. Using the input device 20, a message is entered in this digital electronic part 19, as described under mode 3. The digital electronic part 19 is controlled through operational control elements, comprising essentially buttons 4 to 7. Messages can be stored in the memory 16 or called up therefrom through the digital electronic part 19. Corresponding messages can be presented on the advertising part, or they can be conveyed to transmitter 17 for transmission, or messages received by receiver 18 can be correspondingly processed.

Transmission of messages by transmitter 17 takes place in digital form, and the receiver 18, too, receives messages which have been transmitted digitally. All timepieces work with the same frequency. An additional frequency is foreseen for advertising transmissions.

Thus with timepieces of this kind messages and announcements can be conveyed as desired to other corresponding timepieces located within the transmission range. Corresponding messages transmitted by other timepieces can also be received. The result is the possibility to communicate. All the timepieces are built to receive all the messages. On the basis of the code which precedes each message, however, the "firmware" of each watch determines whether the message is to be stored or not.

It is also conceivable that, as an additional option, transmitting and receiving functions can be switched on to control various devices, such as, for example, household appliances or industrial apparatus. A further option could consist in being able to switch over the communication functions to a personal computer for the output of received messages and input of messages to be transmitted.

What is claimed is:

1. A timepiece messaging unit comprising:

a means to display and set time into said unit;

a rotatable ring mounted around said display upon which signs and symbols are placed and wherein an index mark on said unit selects signs and symbols;

actuation means to enter into said unit a message composed of the selected signs and symbols;

means to transmit to all like messaging units, within a given distance, messages composed of the selected signs and symbols;

means to receive all messages from like message units;

memory means to store received messages; means to display messages; and control means to control the display of received messages.

2. A device as in claim 1 further comprising:

means to control a display of stored messages.

3. A device as in claim 1 wherein the timepiece messaging unit is adapted to fit on a human wrist.

4. A device as in claim 1 further comprising:

code production means for producing a code which allows for a selective display of messages received.

* * * * *